United States Patent [19]

Omoda et al.

[11] Patent Number: 4,525,796
[45] Date of Patent: Jun. 25, 1985

[54] PIPELINED OPERATION UNIT FOR VECTOR DATA

[75] Inventors: Koichiro Omoda; Yasuhiro Inagami, both of Hadano; Shunichi Torii, Musashino; Shigeo Nagashima, Hachioji, all of Japan

[73] Assignee: Hitachi, Ltd., Tokyo, Japan

[21] Appl. No.: 347,720

[22] Filed: Feb. 10, 1982

[30] Foreign Application Priority Data

Feb. 13, 1981 [JP] Japan .................. 56-19091

[51] Int. Cl.³ ............................................. G06F 7/00
[52] U.S. Cl. ..................................... 364/730; 364/200
[58] Field of Search ............... 364/730, 736, 200, 726

[56] References Cited

U.S. PATENT DOCUMENTS

| | | | |
|---|---|---|---|
| 3,787,673 | 1/1974 | Watson et al. | 364/200 |
| 4,041,461 | 8/1977 | Kratz et al. | 364/736 |
| 4,231,102 | 10/1980 | Barr et al. | 364/726 |
| 4,270,181 | 5/1981 | Tanakura et al. | 364/200 |
| 4,295,125 | 10/1981 | Langdon, Jr. | 364/736 |
| 4,302,818 | 11/1981 | Niemann | 364/736 |

*Primary Examiner*—Felix D. Gruber
*Assistant Examiner*—Thomas G. Black
*Attorney, Agent, or Firm*—Antonelli, Terry & Wands

[57] ABSTRACT

In an operation unit wherein a series of data is sequentially applied, a predetermined operation is performed in synchronism with the input data in a pipelined manner, and the predetermined operation is applied to an input data and the result of the predetermined operation for a preceding input data. There are provided a plurality of partial operation devices which respectively compute a plurality of different partial data of a result data to be obtained as a result of the predetermined operation, and when one of the partial data is obtained, the one partial data is immediately used for the operation for the subsequent input data. Consequently, the operation for the subsequent input data can be started before the operation for the remainder of the partial data of the preceding input data is completed.

12 Claims, 13 Drawing Figures

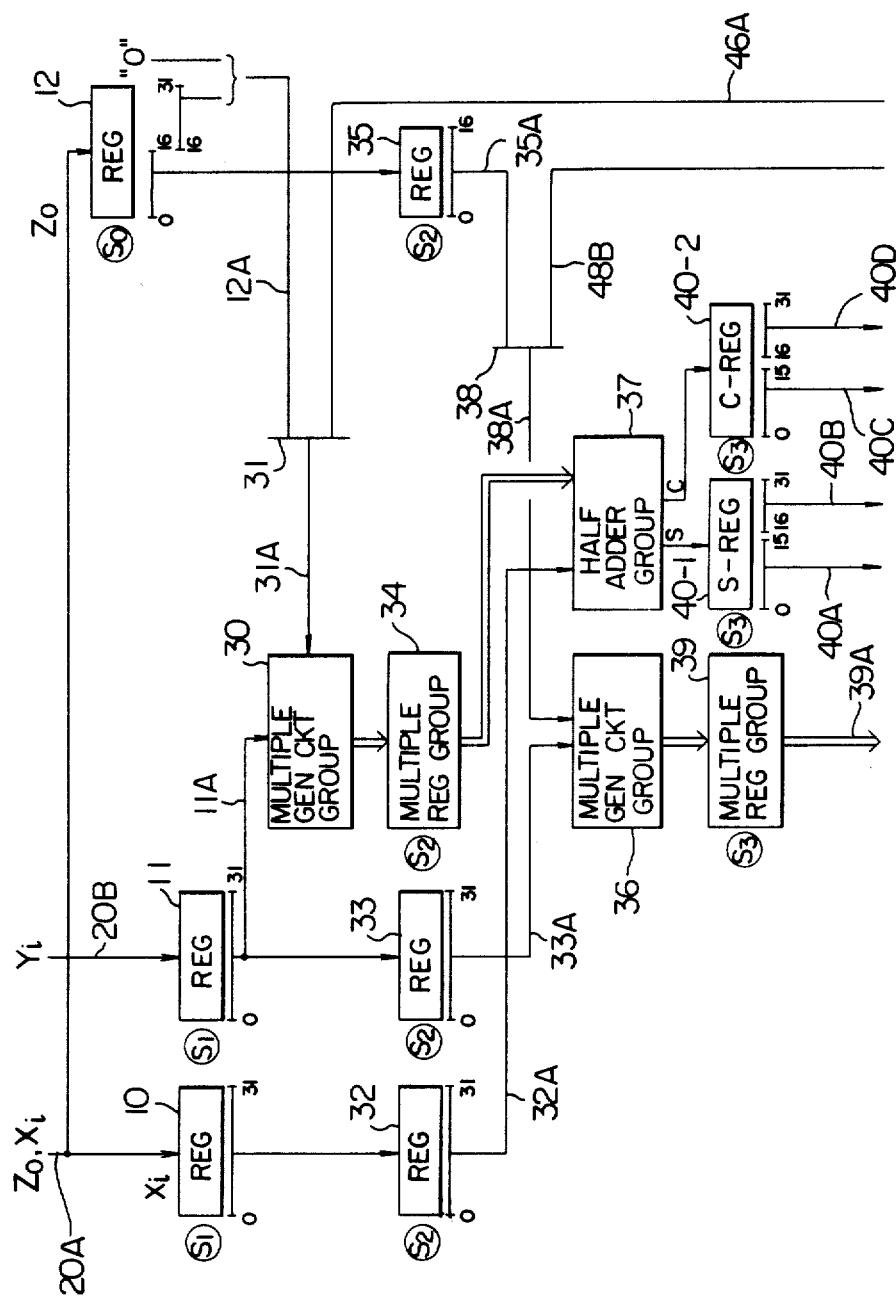

FIG. 8A
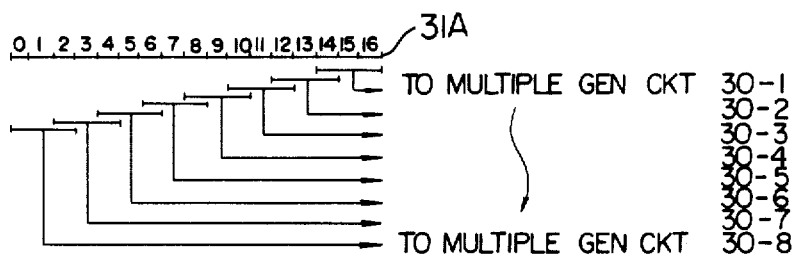
FIG. 8B
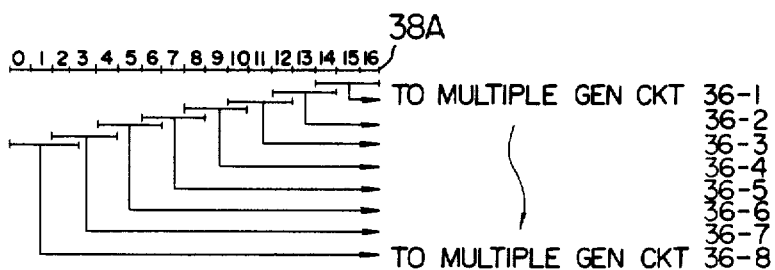
FIG. 9
| VALUE OF PARITIAL 3 BITS OF MULTIPLIER | | | MULTIPLE OF MULTIPLICAND |
|---|---|---|---|
| UPPER | MIDDLE | LOWER | |
| 0 | 0 | 0 | 0 TIMES |
| 0 | 0 | 1 | +1 TIMES |
| 0 | 1 | 0 | +1 TIMES |
| 0 | 1 | 1 | +2 TIMES |
| 1 | 0 | 0 | -2 TIMES |
| 1 | 0 | 1 | -1 TIMES |
| 1 | 1 | 0 | -1 TIMES |
| 1 | 1 | 1 | 0 TIMES |
FIG. 10
| INPUT | | | OUTPUT | |
|---|---|---|---|---|
| I1 | I2 | I3 | S | C |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

PIPELINED OPERATION UNIT FOR VECTOR DATA

BACKGROUND OF THE INVENTION

This invention relates to an arithmetic and logical operation unit for performing the operation of a series of vector data in a pipelined manner.

In line with current progress in scientific technology, large-scale and fast technical computation has urgently been demanded. Especially, the attainment of a fast vector operation presents a significant problem. Currently, computers dedicated to vector operations (hereinafter referred to as vector processors) such as the Cray 1 and Cyber 205 have been commercialized which accomplish high performance by performing vector operations in a pipelined fashion.

FIG. 1 shows, in schematic block form, a vector processor which comprises a main storage 1, a storage control 2, an instruction control 3, and m arithmetic and logical units (ALUs) 4-1, 4-2, . . . and 4-m. The instruction control 3 reads instructions from the main storage 1 via the storage control 2, reads operands from the main storage 1 on the basis of decoded information of the read-out instructions, and controls the selection of one or more of the ALUs 4-1 to 4-m for effecting the operation designated by the read-out instructions, the supply of the read-out operands to the selected ALUs and the writing of operation results into the main storage 1. Where a vector operation is designated by the instructions, a pipelined procedure is carried out as will be outlined by way of the ALU 4-1 and by referring to FIG. 2. In FIG. 2, the ALU 4-1 includes stage ALUs 4-1-1, 4-1-2, . . . and 4-1-8 for respectively performing operation stages 1 to 8. In general, the ALU carries out the operation in a pipelined manner by dividing the operation into a plurality of operation stages and the stage ALUs are provided correspondingly to the operation stages. In an example of FIG. 2, the ALU 4-1 has eight of such stage ALUs.

In operation, operands $X_i$ and $Y_i$ ($i=0 \sim (n-1)$) are read out of the main storage 1 via the storage control 2 and sequentially applied to the ALU 4-1 at a fixed rate called the pipeline pitch. The applied operands are subjected to operations at the stage ALUs 4-1-1 to 4-1-8, and operation results $Z_i$ ($i=0 \sim (n-1)$) are written sequentially into the main storage 1 via the storage control 2. The pipeline pitch referred to herein corresponds to the processing time for one operation stage. If the processing of each of the operation stages is completed within one cycle, the pipeline pitch is one cycle.

In an operation wherein the processing of an i-th data element is independent of the operation results of the 1st to (i−1)-th data elements, when the processing of the i-th element is carried out, for example, at the stage ALU 4-1-2, the processing of an (i+1)-th element can simultaneously be carried out at the stage ALU 4-1-1. Thus, the pipelined procedure advantageously permits continuous processings thereby presenting high performance. In contrast with this procedure, assume that the following operations are to be carried out $$Z_{i+1} \leftarrow X_i + Y_i \times Z_i \quad (1)$$

$$Z_{i+1} \leftarrow X_i + Z_i \quad (2)$$

$$Z_{i+1} \leftarrow X_i \times Z_i \quad (3)$$

$$S \leftarrow \Sigma X_i + S \quad (4)$$

where $X_i$, $Y_i$, $Z_i$ and $Z_{i+1}$ each represents an element of different vector data element and S a scaler data, and that, in equation (4), the total summation is obtained by sequentially summing up respective elements of vector data in the order from lower to higher ordinal numbers of the elements.

Conventionally, the processing of the i-th element is started after an operation of the (i−1)-th element has been completed. This raises the problem that it is impossible to make the most of advantages of the pipelined procedure and the operation speed is retarded.

For example, the operation of the equation (1) has been conventionally carried out by an ALU as shown in FIG. 3 which comprises a multiplier 5 including 8 stage ALUs 5-1, 5-2, . . . and 5-8, a selector 5-9, and an adder 6 including stage adders 6-1 and 6-2. It should be appreciated that the number of stage ALUs, 8 in this example, and the number of stage adders, 2 in this example, may be changed depending on the nature of operation. The sequence of the operation procedure of equation (1) is as follows.

(1) Operation of 0-th Elements

A data element $Y_0$ is fed via a line 8 to the multiplier 5, a data element $Z_0$ is fed via a line 7 and the selector 5-9 to the multiplier 5, and a product $Y_0 \times Z_0$ obtained from the 8 stage ALUs 5-1 to 5-8 is fed to the adder 6. In synchronism with the application of the product to the adder 6, a data element $X_0$ is also fed to the adder 6 via the line 7, these two inputs to the adder 6 are added at the two stage ALUs 6-1 and 6-2, and the output of the adder, which is equal to a sum $Z_1$, is delivered to the storage control 2.

(2) Operation of the Remaining Elements

When an element $Z_1$ is delivered to the storage control 2, an element $Y_1$ is fed via the line 8 to the multiplier 5 and at the same time, an element $Z_1$ is fed to the multiplier 5 via the line 7 and the selector 5-9. And, a product $Y_1 \times Z_1$ obtained from 8 stage ALUs 5-1 to 5-8 is fed to the adder 6. In synchronism with the application of the product $Y_1 \times Z_1$ to the adder 6, the element $X_1$ is also fed to the adder 6 via the line 7, and these two inputs are added at the two stage ALUs 5-1 and 5-2 to deliver a sum $Z_2$ to the storage control 2. For elements $Z_2$ to $Z_{(n-1)}$, a similar operation procedure is repeated.

Such a prior art process requires for obtaining an operation result on each element to process ten stages of multiplier and adder operations, resulting in loss of advantages of the pipelined procedure and lower operation speed.

SUMMARY OF THE INVENTION

An object of this invention is therefore to provide an operation unit wherein the operation of an i-th element is started before completion of the operation of an (i−1)-th element, whereby performance of the pipelined procedure can be improved.

To this end, according to this invention, a plurality of partial units are provided for respectively producing individual partial data which are divided parts of the operation result to be obtained for each element and when one of the partial data has been produced, this partial data is immediately utilized for the operation of an element following that element before the remaining partial data for that element is obtained.

BRIEF DESCRIPTION OF THE DRAWINGS

FIGS. 5A and 5B in combination show a block diagram of an operation unit embodying the invention.

FIG. 8A is a diagram for explaining the connection between a selector 31 and the multiple generating circuit group 30 in FIG. 5A.

FIG. 8B is a diagram for explaining the connection between a selector 38 and the multiple generating circuit group 36 in FIG. 5A.

FIG. 9 shows input/output characteristics of the multiple generating circuit 37 shown in FIG. 7.

FIG. 10 shows input/output characteristics of the half adder shown in FIG. 7.

DESCRIPTION OF A PREFERRED EMBODIMENT

Prior to describing a preferred embodiment of the invention, the principle of the operation procedure will be described by way of the operation pursuant to equation (1).

Figure 4:
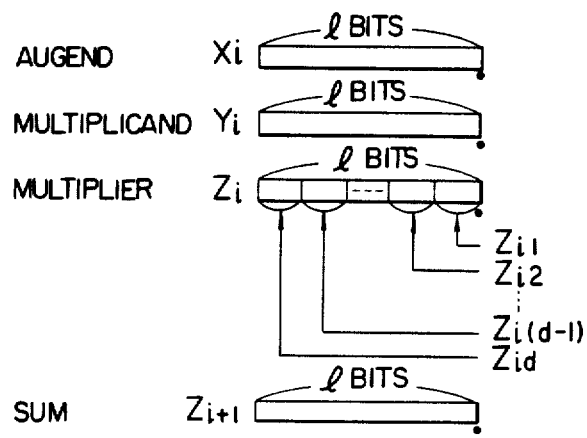
FIG. 4 shows data formats of operands used in an embodiment of the invention.

Data of operands $X_i$, $Y_i$, and $Z_i$ and an operation result $Z_{i+1}$ in equation (1) are assumed to have an l-bit length as shown in FIG. 4 and to have a fixed point directly on the right of the least significant bit as shown by dots. The element $Z_i$ is divided into d pieces of partial data each having a number a of bits. The number d is defined herein to be equal to l/a, but may be generally $d = \lceil l/a \rceil$ ($\lceil \rceil$: Gaussian symbol). The respective divided partial data, each of a bits, are referred to as 1st partial data to d-th partial data sequentially from lower to higher order and represented by $Z_{i1}$ to $Z_{id}$. According to the invention, the operation of equation (1) is divided into partial operations to individually obtain the respective partial data and results of the partial operations are added.

In a 1st step, a multiple $M_{i1} = Y_i \times Z_{i1}$ is computed.

In a 2nd step, a sum $P_{i1}$ of the multiple $M_{i1}$ and an element $X_i$, and a multiple $M_{i2} = Y_i \times Z_{i2}$ are computed. In a 3rd step, a multiple $M_{i3} = Y_i \times Z_{i3}$ is computed and the multiple $M_{i2}$ obtained in 2nd step is added to the sum $P_{i1}$ to obtain a sum $P_{i2}$. In a 4-th step, a multiple $M_{i4} = Y_i \times Z_{i4}$ is computed and the multiple $M_{i3}$ obtained in 3rd step is added to the sum $P_{i2}$ to obtain a sum $P_{i3}$. In a 5-th step, a multiple $M_{i5} = Y_i \times Z_{i5}$ is computed and the multiple $M_{i4}$ obtained in 4-th step is added to the sum $P_{i3}$ to obtain a sum $P_{i4}$. Similar operations are sequentially carried out which finalize in d-th step.

Subsequently, in the (d+1)-th step, a sum $P_{id}$ of a multiple $M_{id} = Y_i \times Z_{id}$ and a sum $P_i$, (d−1), both obtained in d-th step, is computed. This sum $P_{id}$ corresponds to the operation result $Z_{i+1}$.

In this type of procedure, the operation result $Z_{i+1}$ is partly determined at a rate of a bits in sequence from lower to higher bits through each step of processing. Accordingly, the procedure for obtaining an element $Z_{i+2}$ is not required to be delayed for its starting until the (d+1)-th step processing for obtaining the element $Z_{i+1}$ has been completed but it can be started following completion of the 2nd step processing.

Figure 5B:
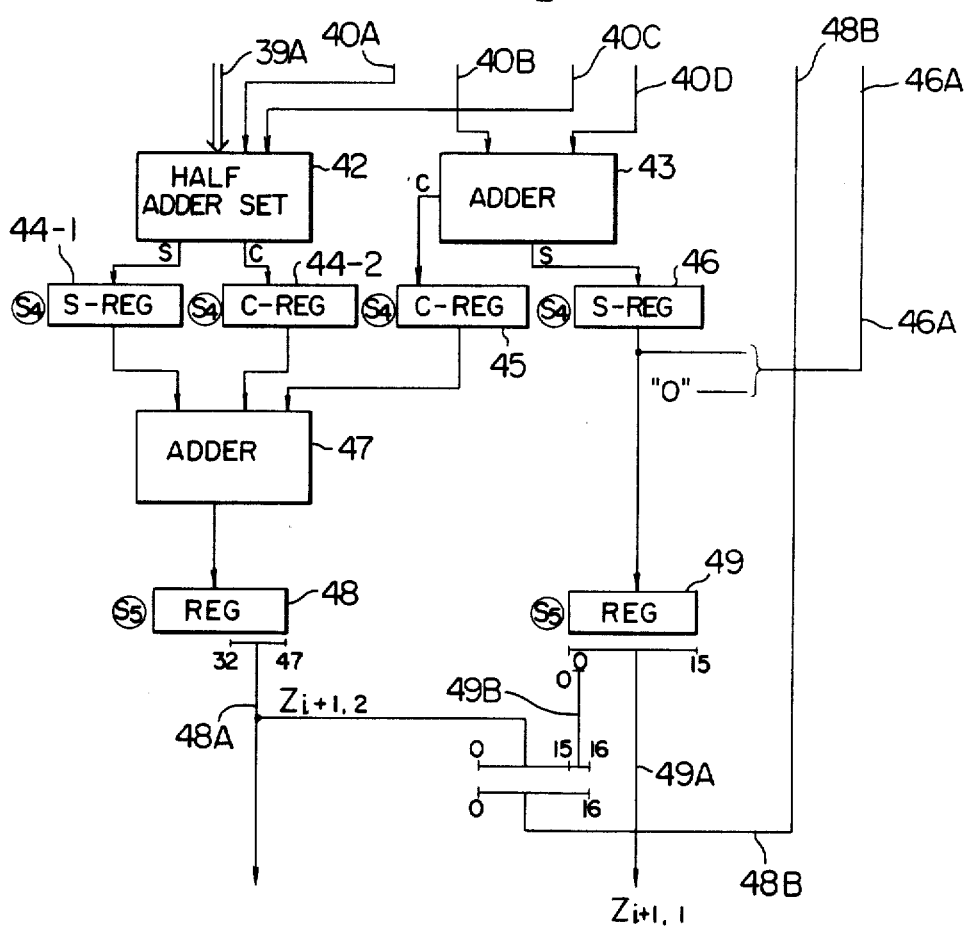

The invention will now be described by referring to an embodiment as illustrated in the figures. FIGS. 5A and 5B show an arrangement adapted to carry out the operation pursuant to equation (1), wherein the number d of divisions of the operand $Z_i$ is assumed as 2 for simplicity of description.

The arrangement as shown in FIGS. 5A and 5B comprises registers 10, 11, 12, 32, 33 and 35 for reception of input elements, half adder groups 37 and 42, sum registers 40-1 and 44-1, carry registers 40-2 and 44-2, adders 43 and 47, a carry register 45, output registers 46, 48 and 49, and selectors 31 and 38. This arrangement of FIG. 5 operates as will be described below with reference to a time chart shown in FIG. 6. In the following operational description, it is assumed that the bit length l of each of the operands $X_i$, $Y_i$ and $Z_i$ and operation result $Z_{i+1}$ is 32.

Figure 6:
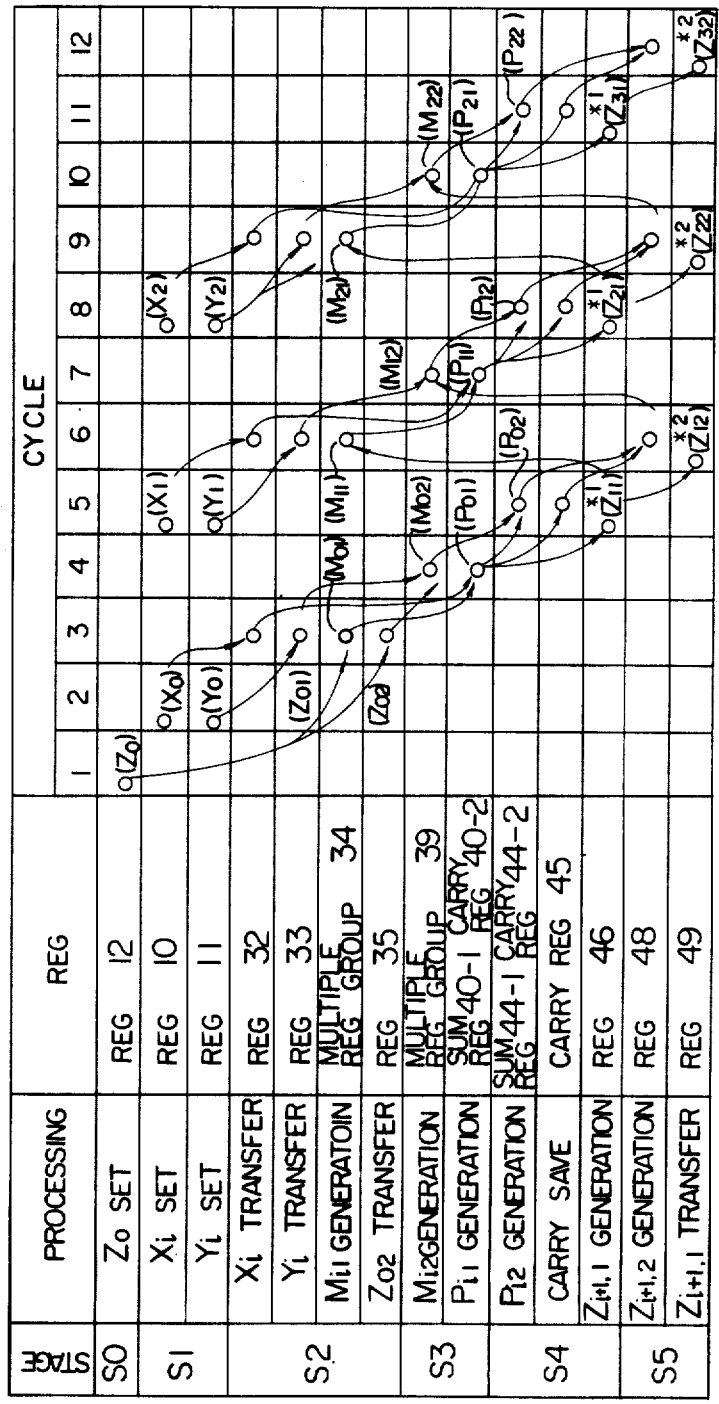
FIG. 6 is a time chart useful in explaining the operation of the unit shown in FIGS. 5A and 5B.

In FIG. 6, the sequence of the operation procedure for equation (1) is divided into 6 stages $S_0$ to $S_5$ each having a processing time of one cycle. In stage $S_0$, an element $Z_0$ is set to the input register 12 and this stage is executed only during cycle 1 in the course of the operation for equation (1). In stage $S_1$, the elements $X_i$ and $Y_i$ are set to the input registers 10 and 11. For example, 0-th, 1st and 2nd elements i.e., $X_0$, $X_1$ and $X_2$ and $Y_0$, $Y_1$ and $Y_2$ are set during cycles 2, 5 and 8, respectively. Stage $S_2$ executed during a subsequent cycle 3, 6 or 9 is adapted to generate a multiple $M_{i1} = Y_i \times Z_{i1}$. Stage $S_3$ executed during a subsequent cycle 4, 7 or 10 is adapted to generate a multiple $M_{i2} = Y_i \times Z_{i2}$ and a sum $P_{i1} \times X_i + M_{i1}$. Stage $S_4$ executed during a subsequent cycle 5, 8 or 11 is adapted to generate a sum $P_{i2} = P_{i1} + M_{i2}$. In this stage, a lower half $Z_{i+1}$, 1 of the operation result $Z_{i+1}$ to be obtained for equation (1) is obtained. In the subsequent stage $S_5$, an upper half $Z_{i+1}$, 2 of $Z_{i+1}$ is obtained. As will be seen from this sequence of operations, the operation for obtaining the element $Z_1$ is executed in 6 divided stages 0 to 5 and the operations for obtaining the subsequent elements $Z_2$, $Z_3$ and so on are executed in 5 divided stages. Further, in parallel with the execution of the stages $S_4$ and $S_5$ for the operation for obtaining the element $Z_1$, the stages $S_1$ and $S_2$ for the operation for obtaining the element $Z_2$ are executed. Similarly, the stages $S_4$ and $S_5$ for obtaining the element $Z_i$ is executed in parallel with the stages $S_1$ and $S_2$ for obtaining the element $Z_{i+1}$.

The operation carried out during each cycle will be described in greater detail.

In FIGS. 5A and 5B, stage symbol (S1) and the like symbols indicated on the left of the registers imply that data is set into the registers during the corresponding stages.

Figure 1:
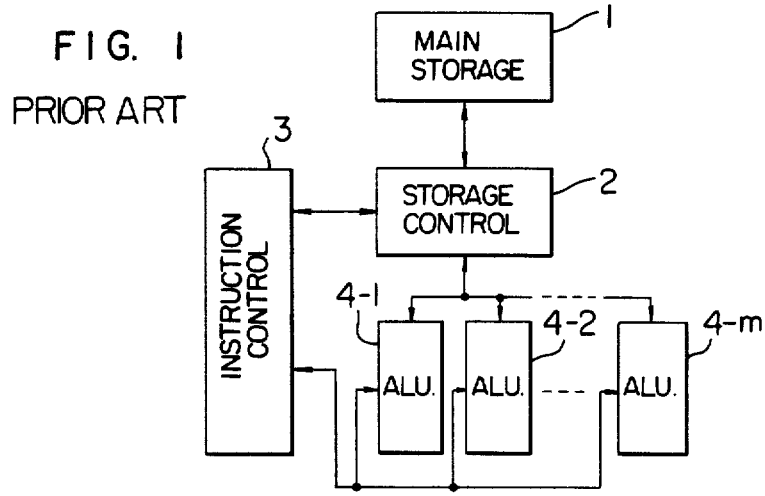
FIG. 1 is a schematic block diagram of a prior art vector processor.
Figure 2:
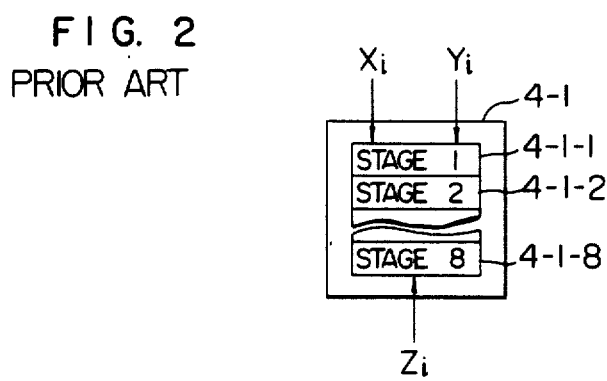
FIG. 2 shows a schematic construction of a prior art arithmetic and logical operation unit.
Figure 3:
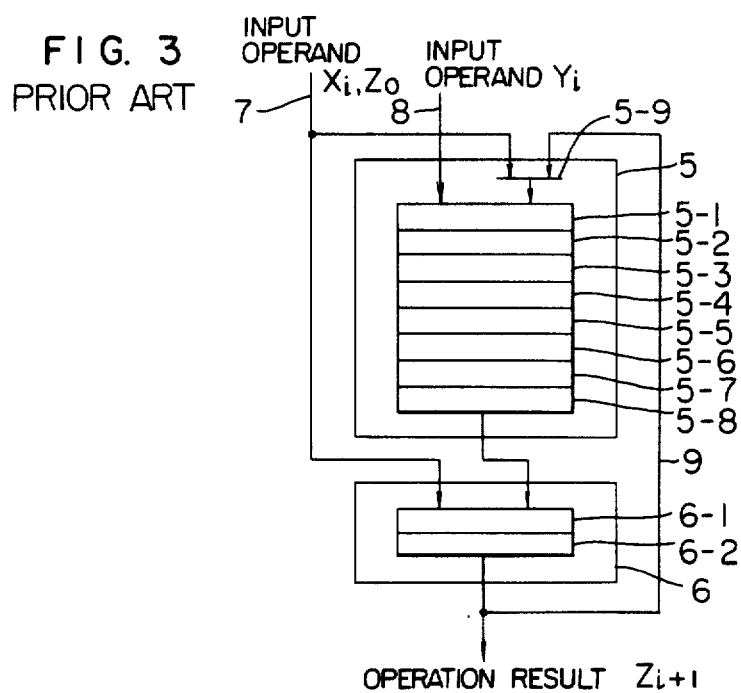
FIG. 3 shows a schematic construction of another prior art arithmetic and logical operation unit.

Cycle 1: The element $Z_0$ from the storage control 2 (FIG. 1) is set into the 32-bit input register 12 via a line 20A.

Cycle 2: The elements $X_0$ and $Y_0$ from the storage control 2 are set into the 32-bit input registers 10 and 11 via lines 20A and 20B, respectively.

Figure 7:
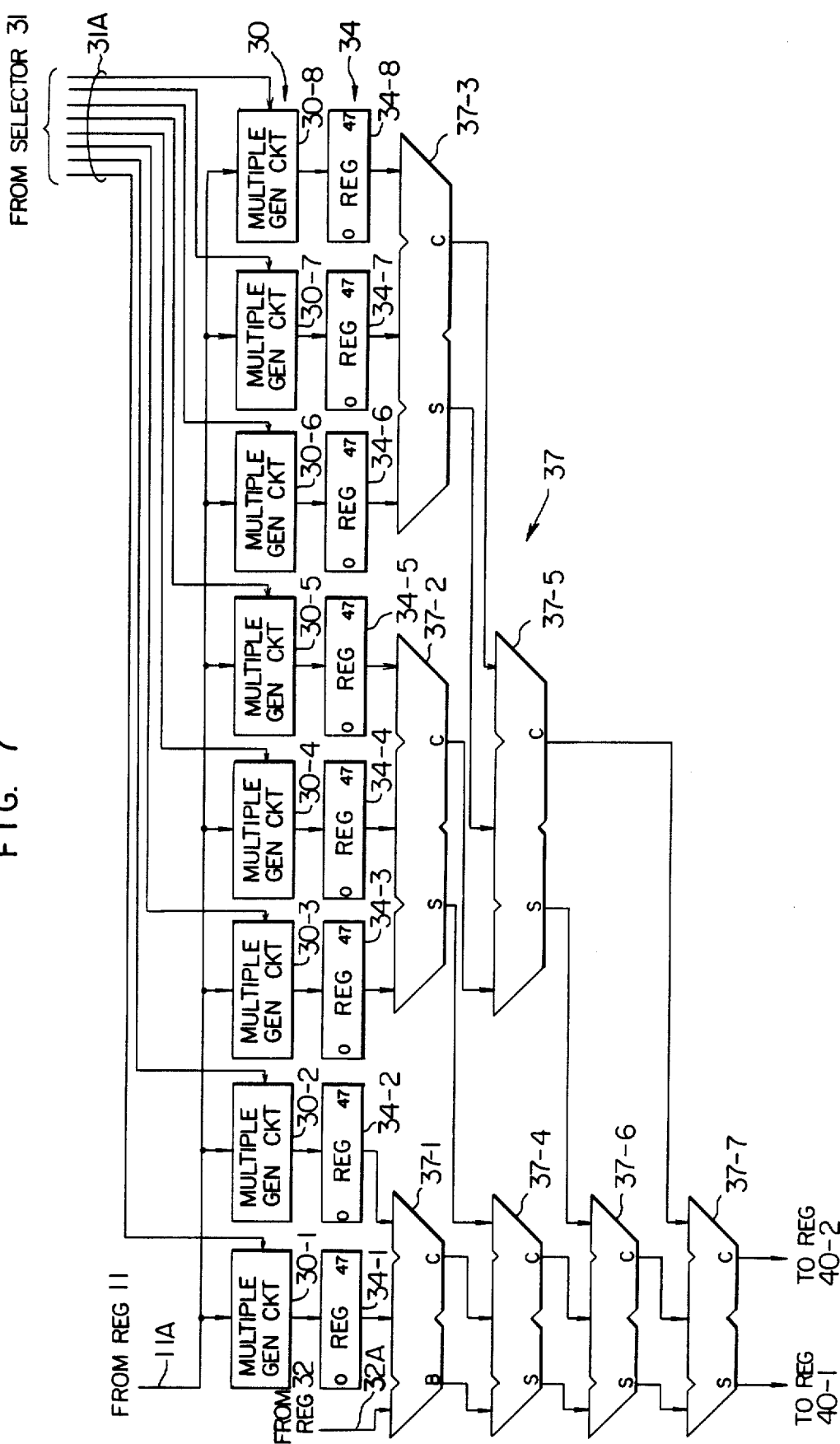
FIG. 7 is a connection diagram of a multiple generating circuit group 30, a multiple register group 34 and a half adder group 37 in FIG. 5A.

Cycle 3: The elements $X_0$ and $Y_0$ stored in the input registers 10 and 11 are transferred to the 32-bit input registers 32 and 33, respectively, and are set thereinto. The element $Y_0$ set into the input register 11 is fed via a line 11A to a multiple generating circuit group 30. The least significant bit of a first partial data $Z_{01}$ containing the lowermost 16 bits of the element $Z_0$ set into the input register 12 is added with one bit "0" to provide data of 17 bits in total and this data is fed to the selector 31 via a line 12A. The selector 31 is so controlled as to select the line 12A during cycle 3 and the 17-bit data is applied via a line 31A to the multiple generating circuit group 30. This circuit 30 generates, based on the two inputs on lines 11A and 31A, a multiple $M_{01} = Y_0 \times Z_{01}$ which is set into a multiple register group 34. A 17-bit data consisting of a second partial data $Z_{02}$ containing the uppermost 16 bits of the element $Z_0$ set into the input register 12 and a lower one bit (16-th digit) is set into the input register 35. The multiple generating circuit group 30 includes 8 multiple generating circuits 30-1 to 30-8 as shown in FIG. 7. The multiple register group 34 includes 8 registers 34-1 to 34-8 connected to the multiple generator circuits 30-1 to 30-8, respectively. Each of the registers 34-1 to 34-8 has a capacity of 48 bits necessary for storing the multiple $M_{01}$. The output of the selector 31 on the line 31A is applied to the multiple generating circuits 30-1 to 30-8 in a manner as shown in FIG. 8A. More particularly, 17 bits of the output 31A are divided into 8 overlapped parts, each of 3 bits, sequentially from lower to higher order, such that the lowest bit position of each part is shifted to the left by two bits from that of the adjacent part of the lower order. The respective parts are applied, as multipliers, to the respective multiple generating circuits 30-1 to 30-8. These multiple generating circuits 30-1 to 30-8 each generates a multiple of the element $Y_0$ which is stored in the input register 11 and is applied as a multiplicand. The thus generated multiple is dependent on the values of 3 bits of multiplier as shown in FIG. 9. The multiples produced from the multiple generating circuits 30-1 to 30-8 are shifted to the left (toward the higher order digits) within the own respective multiple generating circuits by respective bit numbers. The bit number to be shifted within each of the respective multiple generating circuits 30-1 to 30-8 is determined to be equal to the difference in bit positions between the bit position in the original output 31A corresponding to the lowest bit of the 3-bit multiplier applied to each multiple generating circuit and the lowest bit position of the original output 31A. The shifted multiples are set into the corresponding multiple registers 34-1 to 34-2. These shifted multiples are adapted to produce the multiple $M_{01}$ if they are summed up. In this manner, the multiple $M_{01}$ is stored, part by part, into the registers 34-1 to 34-8. The manner of obtaining a multiple by using the divided 3-bit multiples as mentioned above is known in the art.

Figure 11:
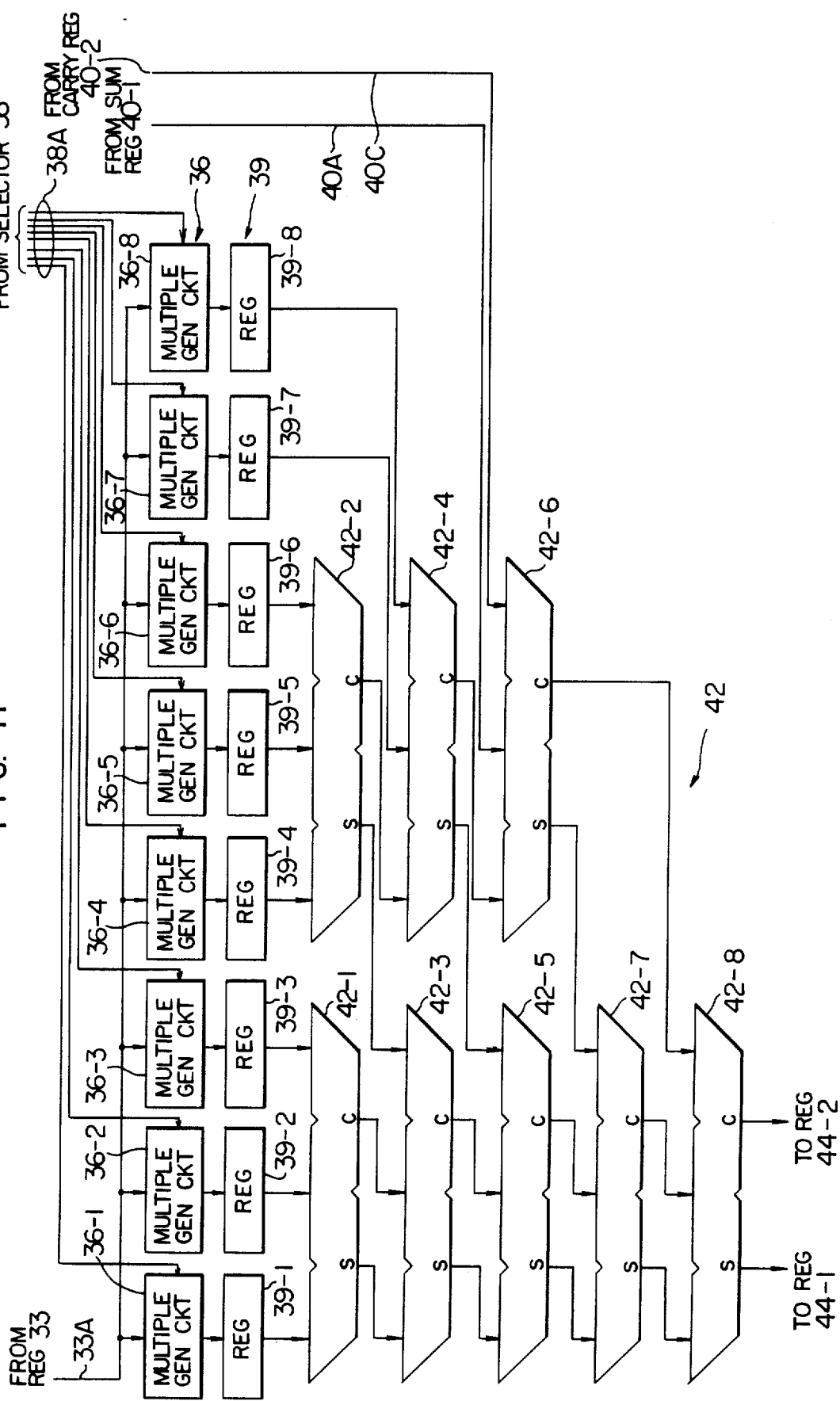
FIG. 11 is a connection diagram of a multiple generating circuit group 36, a multiple register group 39 and a half adder group 42 in FIGS. 5A and 5B.

Cycle 4: The multiplicand $Y_0$ set into the input register 33 is fed via a line 33A to a multiple generating circuit group 36. During this cycle, the selector 38 is so controlled as to select the 17-bit multiplier delivered out of the input register 35 onto a line 35A. This 17-bit multiplier is then fed via a line 38A to the multiple generating circuit group 36 which, upon receipt of the two inputs, produces a multiple $M_{02} = Y_0 \times Z_{02}$ which is set into a multiple register group 39. As shown in FIG. 11, the multiple generating circuit group 36 includes 8 multiple generating circuits 36-1 to 36-8, and the multiple register group 39 includes 8 multiple registers 39-1 to 39-8. Each of the multiple registers 39-1 to 39-8 has a capacity of 48-bits. The 17-bit output 38A of the selector 38 is applied to the multiple generating circuits 36-1 to 36-8 after being divided into 8 overlapped parts as shown in FIG. 8B. That is, the 17-bit multiplier is divided into 8 overlapped parts, each of 3 bits, sequentially from lower to higher order such that the lowest bit position of each part is shifted to the left by two bit positions from that of the adjacent part of the lower order. The respective parts are applied, as multipliers, to the multiple generating circuits 36-1 to 36-8, respectively. These multiple generating circuits 36-1 to 36-8 have the same construction as the multiple generating circuits 30-1 to 30-8 and each generates a multiple as shown in FIG. 9 based on a corresponding one of the divided 3-bit multipliers and on the multiplicand $Y_0$ set into the input register 33. The multiples thus produced are shifted within the respective multiple generating circuits by predetermined bit numbers in the manner mentioned with reference to the multiple generating circuits 30-1 to 30-8. The shifted multiples are set into the multiple registers 39-1 to 39-8, respectively. These shifted multiples are adapted to produce the multiple $M_{02}$, if they are summed up. In this manner, the multiple $M_{02}$ is stored, part by part, in the registers 39-1 to 39-8.

Further, in this cycle 4, the element $X_0$ set into the input register 32 and the multiple $M_{01}$ distributively set into the multiple registers 34-1 to 34-8 are fed to the half adder group 37 which in turn produces a sum $P_{01}$. This addition is carried out by 7 half adders 37-1 to 37-7 as shown in FIG. 7, whereby a sum S and a carry C are produced from the half adder 37-7 and set into the sum register 40-1 and the carry register 40-2, respectively. Each of the half adders 37-1 to 37-8 performs the addition as shown in FIG. 10 of respective bits of three inputs I1, I2 and I3 each having 48 bits and delivers the 48-bit sum S and the 48-bit carry C. The half adder 37-1 is connected to the input register 32 and the multiple registers 34-1 and 34-2, the half adder 37-2 to the multiple registers 34-3 to 34-5, and the half adder 37-3 to the multiple registers 34-6 to 34-8. The half adders 37-4 to 37-7 are connected mutually and to the half adders 37-1 to 37-3 as shown in FIG. 7. The half adder 37-7 of the final stage delivers the sum S and carry C representative of a sum P1 of the element $X_0$ from the register 32 and a multiple M1 in the multiple registers 34-1 to 34-8. The sum S and carry C have each 48 bits. The sum S and the carry C delivered out of one half adder is received by another half adder in accordance with the aforementioned connection and in this process, the carry C is shifted by one bit to the left (the least significant bit is added with "0") to match the unit. The sum S is received without undergoing the shifting.

Cycle 5: The multiple $M_{02}$ distributively set into the multiple registers 39-1 to 39-8 is fed to the half adder group 42 via a line 39A. Uppermost 16 bits of values set into the sum register 40-1 and the carry register 40-2 are also fed to the half adder group 42 via lines 40A and 40C. As shown in FIG. 11, the half adder group 42 includes 8 half adders 42-1 to 42-8. Like the half adders 37-1 to 37-7, the half adders 42-1 to 42-8 are three-input 48-bit half adders. The half adder 42-1 is connected to multiple registers 39-1 to 39-3, the half adder 42-2 to multiple registers 39-4 to 39-6, the half adder 42-4 to multiple registers 39-7 and 39-8 and the half adder 42-2, the half adder 42-6 to the half adder 42-4 and the registers 40-1 and 40-2, and the half adders 42-3, 42-5, 42-7 and 42-8 to the remaining half adders as shown in FIG. 11. Through these half adders, the half adder 42-8 of the final stage delivers, as a sum output S and a carry output C, a summation of the multiple M2 in the multiple registers 39-1 to 39-8 and the sum $P_{02}$ in the sum register 40-1 and carry register 40-2. The sum S and the carry C are set into the sum register 44-1 and the carry register 44-2, respectively.

The reason why only the uppermost 16 bits of the values stored in the sum register 40-1 and the carry register 40-2 are fed to the half adder group 42 is that when adding the sum $P_{01}$ generated during cycle 3 and set into the sum register 40-1 and carry register 40-2 to the multiple $M_{02}$ generated during cycle 4 and distributively set into the multiple registers 39-1 to 39-8, the digit position is required to be shifted for this addition by a number of bits of the first partial data $Z_{01}$. And, the lowermost bits of the registers 40-1 and 40-2 are fed to the adder 43 via lines 40B and 40D, a resulting summation is set into the output register 46, and a carry (one bit) derived from the most significant bit is set into the carry register 45. In this manner, the lowermost 16 bits, $Z_{11}$, of $Z_1$ are set into the register 46. In parallel with the above operation, elements $X_1$ and $Y_1$ to be processed subsequently are set into the input registers 10 and 11.

Cycle 6: The values set into the sum register 44-1 and carry register 44-2 and the value set into the carry register 45 are fed to the adder 47, and a resulting summation is set into the output register. The adder 47 receives 48-bit data from each of the registers 44-1 and 44-2 and 1-bit data from the register 45, and adds the 1-bit data to the least significant bit of each of the two 48-bit data inputs. The value of the output register 46 is set into the output register 49. In this manner, the lower half of 16 bits, $Z_{11}$, of the desired result $Z_1$ is obtained from the output register 49 and the upper half of the 16 bits, $Z_{12}$, of $Z_1$ is obtained from the lower 16 bits set into the output register 48. These lower and upper halves are sent to the storage control (FIG. 1) or other ALUs via lines 48A and 49A. Thus, the computation of $Z_1$ is completed.

The subsequent elements $X_1$ and $Y_1$ set into the input registers 10 and 11 are then set into the input registers 32 and 33, respectively. The value of the input register 11 is fed to the multiple generating circuit group 30, and 17 bits, originating from the 16 bit value (lowermost 16 bits, $Z_{11}$, of $Z_1$) of the output register 46 set during the previous cycle which is added with one bit of "0" at the least significant digit, are fed to the selector 31 via a line 46A. The selector 31 selects the line 46A during other cycles than cycle 3. Accordingly, data on the line 46A is also fed via the line 31A to the multiple generating circuit group 30 which, upon receipt of the two inputs, generates a multiple $M_{11} = Y_1 \times Z_{11}$ as in the preceding operation. The multiple $M_{11}$ is set into the multiple register group 34.

Cycle 7: The value of the input register 33 is fed to the multiple generating circuit group 36, and 17 bits, originating from addition of the most significant one bit of the output register 49 on the line 49B to the lowermost digits of the 16-bit value $Z_{12}$ (uppermost 16 bits of $Z_1$) delivered to the line 48 from the lowermost digits of the output register 48 set during the previous cycle, are generated on a line 48B and fed to the selector 38. This selector 38 is so controlled as to select the line 48B during other cycles than cycle 4. Consequently, the data on the line 48B is also fed via the selector 38 to the multiple generating circuit group 36 which is responsive to the two inputs to generate, as in the precedence, a multiple $M_{12} = Y_1 \times Y_{12}$ which in turn is set into the multiple register group 39. In parallel therewith, the element $X_1$ set into the input register 32 and the multiple $M_{11}$ distributively set into the multiple registers 34-1 to 34-8 are fed to the half adder group 37. As described above, when receiving these inputs, the 7 half adders 37-1 to 37-7 perform the half addition to produce a sum and a carry representative of a sum $P_{11}$, and the sum and carry are fed to the sum register 40-1 and carry register 40-2, respectively.

Subsequently, the above processings are repeated through 12 cycles until the operation for three elements is completed. As will be seen from FIG. 6, the operations for the 2nd and 3rd elements are started immediately when the lowermost 16 bits of the results of operations for the 1st and 2nd elements are determined.

For execution of equation (3), this embodiment may be modified in such a manner that the circuit portions (registers 10 and 32) relating to the processing of $X_i$ are eliminated, and $Y_i$ is applied in place of $X_i$. For execution of equation (2), the modification of this embodiment may be such that the circuit portions (registers 11 and 33, multiple generating circuit groups 30 and 36, half adder groups 37 and 42, and registers 34, 39, 40 and 44) for generation of the product $Y_i \times Z_i$ are eliminated, the output of the selector 31A and the output $X_i$ of the register 10 are fed to the adder 43, and the outputs of the selector 38 and register 45 are fed to the adder 47. In addition, the register 10 may be eliminated. Next, for execution of equation (4), a similar modification as applied for equation (2) may be employed, whereby the element $Z_{i+1}$ having the maximum ordinal number $(i+1)$ becomes equal to S and only the S is delivered out.

As has been described, according to the present invention, before the operation for the preceding element of the vector operand is completed, the operation for the subsequent element is started so that these operations can be carried out in parallel with each other, thereby attaining fast vector operations.

1. An operation unit wherein a plurality of first data, which are sequentially supplied, each undergoes a predetermined operation which involves at least a part of the result obtained by the predetermined operation involving a first data preceding the first data being operated on, said operation unit comprising:

first means connected to receive said first data and second data for performing a first operation on each of said first data involving said second data applied thereto, thereby to produce a first partial data representing a first part of a resultant data obtained as a result of said predetermined operation to each first data on an intermediate data to be used for obtaining a second partial data representing a second part of said resultant data;

second means for performing a second operation on said intermediate data thereby to produce said second partial data; and input means for applying to said first means, as said second data, a first partial data which is obtained by performing said first operation on one of said first data preceding the first data being operated on, wherein said first means performs said first operation on each first data in parallel with the execution of said second operation by said second means.

2. An operation unit according to claim 1 wherein said input means further comprises means for applying to said first means, in synchronism with the application of an initial one of said sequentially applied first data to said first means, an initial value independent of the output of said first means to said first means as the second data.

3. An operation unit according to claim 1 or 2 further comprising means connected to said first means for delaying said first partial data provided by said first means for each first data until said second partial data for each first data is delivered out by said second means, and means for simultaneously providing said second partial data for each first data delivered by said second means and said first partial data for each first data delivered by said delaying means as said result data for each first data.

4. An operation unit according to claim 1 wherein said first means comprises third means for performing a third operation on each first data and such first partial data as obtained for the first data being operated on thereby to produce said intermediate data for each first data, and fourth means for performing a fourth operation on said intermediate data for each first data thereby to produce the first partial data for each first data, wherein said second means is operated on in response to the intermediate data for said first data in parallel with the operation of the fourth means responsive to the intermediate data.

5. An operation unit according to claim 1 wherein said first means comprises a first group of first partial operation means which are operated in a pipelined manner in response to a clock signal, and said second means comprises a second group of second partial operation means which are operated in the same manner as the first group, whereby at least a part of the first group executes one of the first partial operations for each first data in parallel with the execution of at least one of the second partial operations for said first data by at least a part of the second group.

6. An operation unit according to claim 5 wherein said first group comprises third partial operation means responsive to each first data and said preceding first data, fourth partial operation means responsive to the output of the third partial operation means to compute the intermediate data for each first data, and fifth partial operation means responsive to the intermediate data for each first data to compute the first partial data for each first data, and said second group comprises sixth partial operation means responsive to the intermediate data for each first data, and seventh partial operation means responsive to the output of the seventh partial operation means to compute the second partial data for each first data, wherein the fifth and sixth partial operation means operate in parallel for each first data.

7. An operation unit according to claim 1 which utilizes first and second partial data for said preceding first data to perform the predetermined operation for each first data, wherein said input means further comprises means for applying the second partial data for the preceding first data to said second means as a third data to be subjected to the second operation along with the intermediate data for each first data, and said second means comprises means for computing second partial data for each first data on the basis of the intermediate data for each first data and the second partial data for said preceding first data.

8. An operation unit according to claim 7 wherein said input means further comprises means for applying an initial value independent of the output of said second means to said second means as the third data to be subjected to the second operation with the intermediate data for an initial first data of said plurality of first data.

9. An operation unit according to claim 7 wherein said first means comprises a first group of a plurality of partial operation means which are operated in a pipelined fashion in response to a clock signal, and said second means comprises a second group of a plurality of partial operation means which are operated in the same manner as the first group, and wherein said first group comprises first partial operation means responsive to each first data and a first data preceding the first data being operated on, second partial operation means responsive to the output of the first partial operation means to compute the intermediate data for each first data, and third partial operation means responsive to the intermediate data for each first data to compute the first partial data for each first data, and said second group comprises fourth partial operation means responsive to the second partial data for the preceding first data, fifth partial operation means responsive to the output of the fourth partial operation means and the intermediate data for each first data, and sixth partial operation means responsive to the output of the fifth partial operation means to compute the second partial data for each first data, wherein said second and fourth partial operation means operate in parallel for each first data, and said third and fifth partial operation means operate in parallel for each first data.

10. An operation unit according to claim 9 further comprising means for delaying each first data for a time period required for the completion of a computation of said first partial operation means, wherein said fourth partial operation means is responsive to each first data thus delayed and the second partial data for said preceding first data.

11. An operation unit according to claim 10 in which the predetermined operation is a multiplication of each first data and the preceding first data, wherein said first partial operation means comprises means for generating a plurality of first multiples for each first data dependent on the first partial data for said preceding first data, said second partial operation means comprises means including a plurality of half adders for adding the plurality of first multiples and producing a first sum and a first carry, said third operation means comprises a full adder for adding a lower data portion of the first sum and that of the first carry to produce a second sum and a second carry, wherein the second sum is delivered out as the first partial data of said result data for each first data, said fourth partial operation means comprises means for generating a plurality of second multiples for each first data delayed by said delay means, dependent on the second partial data for said preceding first data, said fifth partial operation means comprises means including a plurality of half adder groups for adding an upper data portion of the first sum and carry applied as the intermediate data for each first data and the plurality of second multiples and producing a third sum and a third carry, and said sixth partial operation means comprises a full adder for adding the second carry, third sum and third carry, wherein the summation is delivered out as the second partial data of said result data for each first data.

12. An operation unit for carrying out recursive operations such as $Z_{i+1} \leftarrow X_i + Y_i \times Z_i$, $Z_{i+1} \leftarrow X_i + Z_i$, and $Z_{i+1} \leftarrow X_i \times Z_i$ and the like, on a plurality of vector data elements such that, during the operation of the i-th element, the operation of the (i+1)th element is started immediately when a portion of the operation result of the i-th element is determined, said operation unit comprising:
- means for dividing each of the elements of vector data into a plurality of partial data;
- a plurality of operation means, each of said operation means carrying out a predetermined operation on every one of said plurality of partial data, respectively;
- control means for enabling each of said plurality of operation means for operation in parallel, such that the operation start time is shifted by a given amount in every operation unit for the operation on partial data in the same element, and for inputting to each operation unit partial data of the next element immediately after the end of an operation;
- transfer means for transferring the result of an operation from each operation means to another operation means; and
- output means for collecting the operation result outputted from each of said operation means with delay for every operation means, respectively, and for outputting the collected operation result as a final operation result.

* * * * *